United States Patent
Koo et al.

(10) Patent No.: US 11,012,382 B2
(45) Date of Patent: May 18, 2021

(54) STATE DISPLAY INFORMATION TRANSMISSION SYSTEM USING CHATBOT

(71) Applicant: 1THEFULL PLATFORM LIMITED, Seoul (KR)

(72) Inventors: Seung-yub Koo, Gyeonggi-do (KR); Cheon Joong Kim, Seoul (KR)

(73) Assignee: 1THEFULL PLATFORM LIMITED, Seoul (KR)

( * ) Notice: Subject to any disclaimer, the term of this patent is extended or adjusted under 35 U.S.C. 154(b) by 0 days.

(21) Appl. No.: 16/761,579

(22) PCT Filed: May 30, 2018

(86) PCT No.: PCT/KR2018/006180
§ 371 (c)(1),
(2) Date: May 5, 2020

(87) PCT Pub. No.: WO2019/088387
PCT Pub. Date: May 9, 2019

(65) Prior Publication Data
US 2020/0274833 A1 Aug. 27, 2020

(30) Foreign Application Priority Data
Nov. 6, 2017 (KR) .......................... 10-2017-0146856

(51) Int. Cl.
*H04L 12/58* (2006.01)
(52) U.S. Cl.
CPC ............ *H04L 51/02* (2013.01); *H04L 51/046* (2013.01); *H04L 51/10* (2013.01)
(58) Field of Classification Search
CPC ......... H04L 51/10; H04L 51/32; H04L 51/04; H04L 51/38; H04L 51/043; H04L 51/24; H04L 41/0672; H04L 41/063; H04L 41/12; H04L 41/174; H04L 41/16; G06Q 20/384; G06Q 20/386; G06Q 20/3255; H04W 4/14; H04W 4/12; H04W 88/184;
(Continued)

(56) References Cited

U.S. PATENT DOCUMENTS 9,325,644 B2 * 4/2016 Douglas ................ H04L 51/043
9,515,969 B1 * 12/2016 Eidelson ................ H04L 51/24
(Continued)

FOREIGN PATENT DOCUMENTS

KR 10-2015-0055926 A 5/2015
KR 10-1544213 B1 8/2015
(Continued)

OTHER PUBLICATIONS

International Search Report for PCT/KR2018/006180 dated Sep. 3, 2018.

*Primary Examiner* — Sargon N Nano
(74) *Attorney, Agent, or Firm* — The PL Law Group, PLLC

(57) ABSTRACT

A state display information transmission system uses a chatbot. According to an embodiment of the present disclosure, in a user terminal and a counterpart terminal, in which a SNS service, an instant message service, etc. operates, even when the user terminal does not respond within a preconfigured response time, a chatbot transmits proper emoticon information, etc. to the counterpart terminal, so that a user can continuously make smooth and proper communication with a counterpart.

3 Claims, 3 Drawing Sheets

(58) Field of Classification Search
CPC ......... H04M 1/72552; H04M 1/72522; H04M 1/72544; H04M 1/72547; H04M 1/72555; H04M 3/5315; H04N 2007/145
See application file for complete search history.

(56) References Cited

U.S. PATENT DOCUMENTS

| | | | | |
|---|---|---|---|---|
| 10,469,607 | B2* | 11/2019 | Brunn | H04L 51/26 |
| 2007/0027920 | A1* | 2/2007 | Alvarado | H04L 67/04 |
| 2007/0027921 | A1* | 2/2007 | Alvarado | G06Q 10/109 |
| 2008/0082613 | A1* | 4/2008 | Szeto | H04L 51/043 |
| | | | | 709/206 |
| 2009/0280843 | A1* | 11/2009 | Wisebourt | H04L 67/24 |
| | | | | 455/466 |
| 2009/0292778 | A1 | 11/2009 | Makar et al. | |
| 2015/0067106 | A1* | 3/2015 | Jaynes | H04L 65/4038 |
| | | | | 709/219 |
| 2016/0050160 | A1* | 2/2016 | Li | H04L 65/4038 |
| | | | | 713/176 |
| 2016/0212266 | A1* | 7/2016 | Soundar | H04M 3/51 |
| 2016/0353269 | A1* | 12/2016 | Kasslin | H04W 48/16 |
| 2017/0331770 | A1* | 11/2017 | Griffin | H04L 51/043 |
| 2018/0092011 | A1* | 3/2018 | Lin | H04W 36/14 |
| 2018/0143761 | A1* | 5/2018 | Choi | H04M 1/72555 |
| 2018/0239837 | A1* | 8/2018 | Wang | G06F 16/17 |
| 2019/0234975 | A1* | 8/2019 | Pothini | G06K 19/0723 |
| 2019/0335008 | A1* | 10/2019 | Majoros | G06Q 50/01 |

FOREIGN PATENT DOCUMENTS

| | | |
|---|---|---|
| KR | 10-2016-0043557 A | 4/2016 |
| KR | 10-2016-0137446 A | 11/2016 |
| KR | 10-2017-0017289 A | 2/2017 |
| KR | 10-2017-0073417 A | 6/2017 |
| KR | 10-1756766 B1 | 7/2017 |

* cited by examiner

STATE DISPLAY INFORMATION TRANSMISSION SYSTEM USING CHATBOT

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/006180 filed on May 30, 2018, which claims priority to the benefit of Korean Patent Application No. 10-2017-0146856 filed in the Korean Intellectual Property Office on Nov. 6, 2017, the entire contents of which are incorporated herein by reference.

TECHNICAL FIELD

This disclosure relates to a state display information transmission system using a chatbot.

BACKGROUND ART

A conventional intelligent conversation robot is a chat robot that means a software agent capable of communicating with a person, and is called a chatterbot, a chatbot, a chatterbox, a conversation agent, or the like.

The intelligent conversation robot does not make a chat between a user and a user but makes a chat between a user and a chat agent, namely between a user and the intelligent conversation robot. Generally, the conversation robot stores expected question/answer pairs in a database by pattern matching in advance to answer a question of a user.

However, since most chat robots are able to answer only when the pattern is exactly matched with an input sentence (question), a large amount of dialogue examples are required, and thus a lot of cost is required to construct a dialogue example database (DB).

In addition, since the existing chat robots do not consider a dialogue context, a chat is performed to give a fixed answer to each question, regardless of past information.

Meanwhile, the use of SNS (Social Network Services/Sites), which an online service that builds a network of people who share a particular interest or activity, and instant message services allowing users to send and receive a text, a photo or a file by installing the same program on PCs and smartphones is exploding.

Also, in addition to text, the use of emoticons or the like for displaying the user's own emotions, status, etc. as images is also becoming active.

However, as the use of SNS, instant messages or the like explosively increases, among users who use SNS service, instant message service or the like, if one party does not confirm or response to a message sent from the other party timely, mutual misunderstandings are accumulating and human relationships are being damaged.

Accordingly, there is a need to develop a chatbot that may appropriately respond to various situations by using emoticons or the like, when one party fails to confirm or response to a message of the other party timely.

Meanwhile, as the prior art related to the above, there are Korean Patent No. 10-1544213, entitled 'Method of using mobile terminal and effect emoticon', Korean Unexamined Patent Publication No. 10-2017-0017289, entitled 'Electronic device and method for transmitting and receiving content', Korean Unexamined Patent Publication No. 10-2016-0043557, entitled 'Smart device providing expanded services', and the like.

SUMMARY

This disclosure is directed to providing a state display information transmission system using a chatbot, which may allow a user terminal and a counterpart terminal in which a SNS service, an instant message service, etc. operates to continue smooth and proper communication since the chatbot transmits proper emoticon information, etc. to the counterpart terminal even when the user terminal does not respond within a preconfigured response time.

An embodiment of the present disclosure to accomplish the above technical object provides a state display information transmission system using a chatbot, which transmits state display information displaying a current state of a user by using a chatbot 103 mounted to a server 101, wherein the chatbot 103 includes: an analyzing module 107 configured to determine whether a user terminal 107 transmits second communication information CI2 satisfying a preconfigured condition to the server 101 in response to first communication information CI1 transmitted from a counterpart terminal 105 to the user terminal 107 through the server 101; and a selecting module 111 configured to search and select state display information SI corresponding to the first communication information CI1 among basic state display information BI stored in a state display information storing module 109 of the server 101, when the second communication information CI2 does not satisfy the preconfigured condition.

Also, there is provided a state display information transmission system using a chatbot, wherein any one of the server 101 and the chatbot 103 may include a transmitting module 113 configured to transmit the state display information SI to the counterpart terminal 105.

In addition, there is provided a state display information transmission system using a chatbot, wherein the preconfigured condition may be a condition about time (a response time) taken for the user terminal 107 to transmit the second communication information CI2 corresponding to the first communication information CI1 to the server 101.

Moreover, there is provided a state display information transmission system using a chatbot, wherein the chatbot 103 may include a log module 115 configured to store a list L about the state display information SI transmitted to the counterpart terminal 105 and transmit the list L to the user terminal 107.

In addition, there is provided a state display information transmission system using a chatbot, wherein the basic state display information BI may include at least one of emoticon information and GIF information having an animation effect.

According to an embodiment of the present disclosure, in a user terminal and a counterpart terminal in which a SNS service, an instant message service, etc. operates, even when the user terminal does not respond within a preconfigured response time, the chatbot transmits proper emoticon information, etc. to the counterpart terminal, so that a user can continuously make smooth and proper communication with a counterpart.

DETAILED DESCRIPTION

Hereinafter, some embodiments of the present disclosure will be described in detail with reference to exemplary drawings. When adding reference symbols to components in each drawing, it should be noted that the same reference symbols are assigned to the same components as much as possible even though they are shown in different drawings. Also, in describing the present disclosure, if it is determined that a detailed description of the related known structure or function may obscure the gist of the present disclosure, the detailed description thereof will be omitted.

In addition, in describing a component of the present disclosure, terms such as "first", "second", "A", "B", "(a)" and "(b)" may be used. These terms are only for distinguishing the component from other components, and the nature, order or sequence of the components are not limited by the terms. If a component is described as being "connected", "coupled" or "contacted" to another component, that component may be directly connected or contacted to another component, but it is to be understood that another element may be further "connected", "coupled" or "contacted" between these components.

Figure 1:
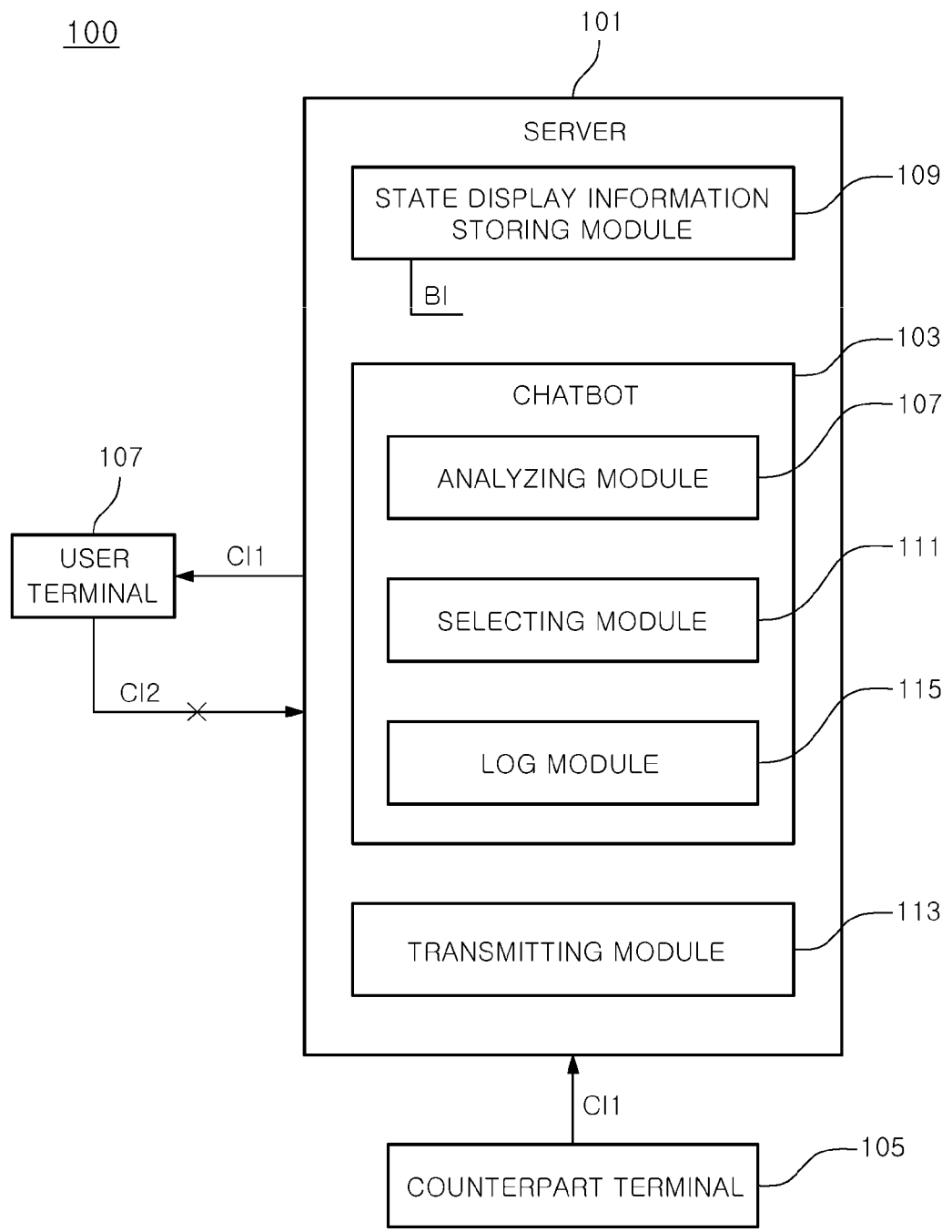
FIG. 1 is a block diagram showing a state display information transmission system using a chatbot according to an embodiment of the present disclosure.

FIG. 1 is a block diagram showing a state display information transmission system using a chatbot according to an embodiment of the present disclosure.

Figure 2:
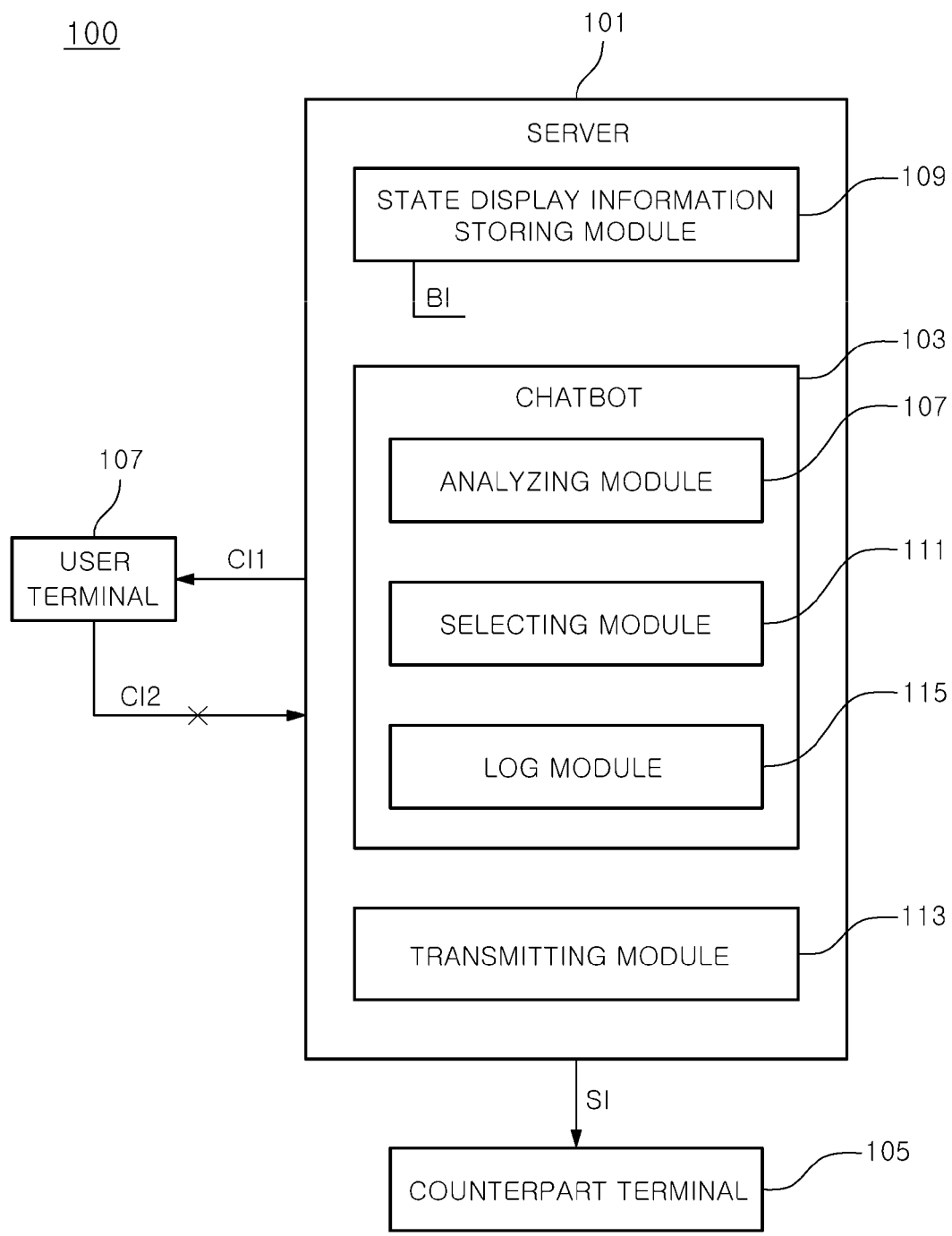
FIG. 2 is a block diagram showing an example where a server of FIG. 1 transmits state display information to a counterpart terminal.

FIG. 2 is a block diagram showing an example where a server of FIG. 1 transmits state display information to a counterpart terminal.

Figure 3:
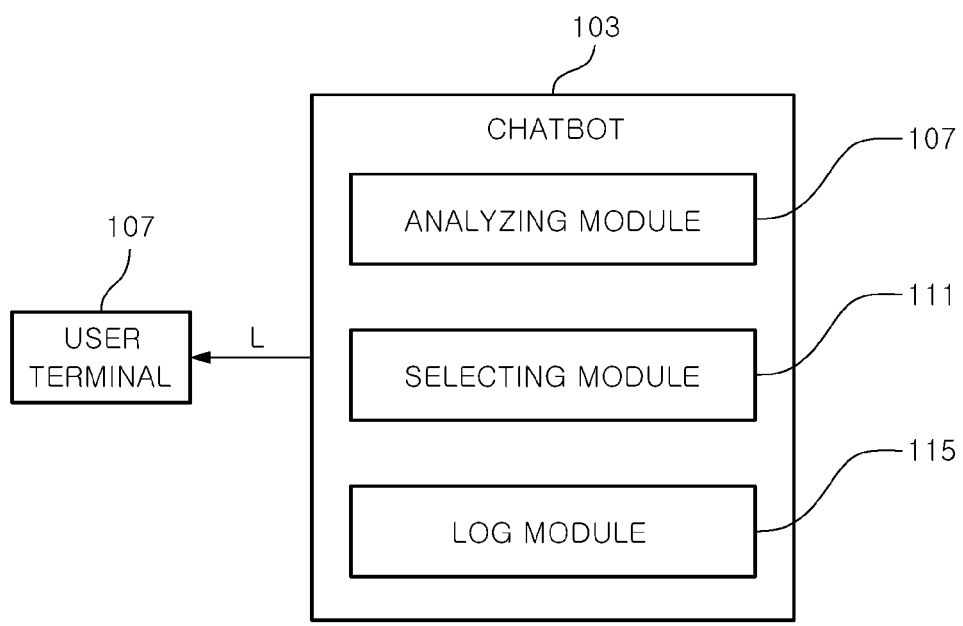
FIG. 3 is a block diagram showing an example where a chatbot of FIG. 1 transmits a list of the state display information to a user terminal.

FIG. 3 is a block diagram showing an example where a chatbot of FIG. 1 transmits a list of the state display information to a user terminal.

Figure 4:
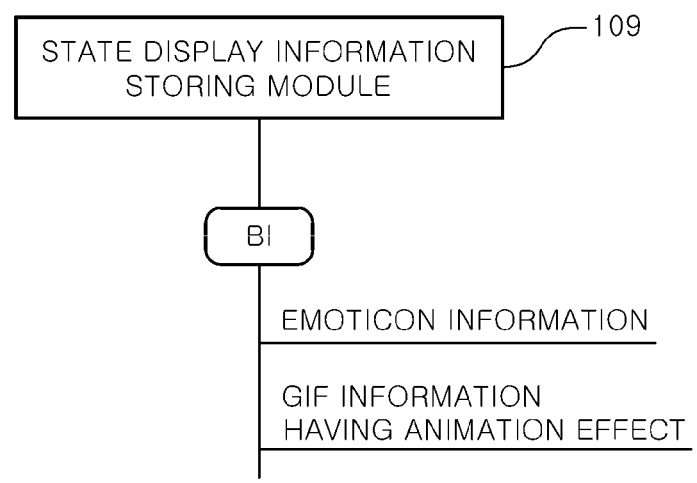
FIG. 4 is a block diagram showing an example of basic state display information stored in a state display information storing module of FIG. 1.

FIG. 4 is a block diagram showing an example of basic state display information stored in a state display information storing module of FIG. 1.

As shown in the figures, an embodiment of the present disclosure provides a state display information transmission system using a chatbot, which transmits state display information displaying a current state of a user by using a chatbot 103 mounted to a server 101, wherein the chatbot 103 includes: an analyzing module 107 configured to determine whether a user terminal 107 transmits second communication information CI2 satisfying a preconfigured condition to the server 101 in response to first communication information CI1 transmitted from a counterpart terminal 105 to the user terminal 107 through the server 101; and a selecting module 111 configured to search and select state display information SI corresponding to the first communication information CI1 among basic state display information BI stored in a state display information storing module 109 of the server 101, when the second communication information CI2 does not satisfy the preconfigured condition.

Hereinafter, each structure is described in detail.

First, the present disclosure relates to a system that transmits state display information displaying a current state of a user by using the chatbot 103 mounted to the server 101.

Here, the chatbot 103 includes an analyzing module 107 and a selecting module 111.

The analyzing module 107 determines whether the user terminal 107 transmits the second communication information CI2 satisfying a preconfigured condition to the server 101.

Here, the second communication information CI2 corresponds to the first communication information CI1 transmitted from the counterpart terminal 105 to the user terminal 107 through the server 101, and is information that satisfies the preconfigured condition.

For example, in the user terminal 107 and the counterpart terminal 105 in which an SNS service, an instant message service, etc. operates, the first communication information CI1 may be text information such as 'How are you feeling today?', 'Can we meet tomorrow evening?', 'Can I make a phone call now?', etc., transmitted from the counterpart terminal 105 to the user terminal 107 through the server 101.

In addition, the second communication information CI2 may be text information such as 'I feel depressed!' corresponding to the text information 'How are you feeling today?', 'Okay!' corresponding to the text information 'Can we meet tomorrow evening?', 'Wait a minute!' corresponding to the text information 'Can I make a phone call now?', etc.

Of course, the first communication information CI1 and the second communication information CI2 may be emoticon information, GIF information having an animation effect, etc., in addition to the text information described above.

Meanwhile, the 'preconfigured condition' is a condition about a time (hereinafter, referred to as a 'response time') taken for the user terminal 107 to transmit the second communication information CI2 corresponding to the first communication information CI1 to the server 101.

Here, the response time may be set to 10 seconds, 20 seconds, 30 seconds, etc. as an example.

For a more specific example, for the text information of 'How are you feeling today?' (the first communication information CI1) transmitted from the counterpart terminal 105 to the user terminal 107 through the server 101, the analyzing module 107 determines whether the user terminal 107 transmits the text information 'I feel depressed!' (the second communication information CI2) to the server 101 within 20 seconds.

Subsequently, if the second communication information CI2 does not satisfy the preconfigured condition described above, the selecting module 111 searches and selects state display information SI corresponding to the first communication information CI1 among basic state display information BI stored in the state display information storing module 109 of the server 101.

For example, if the user terminal 107 does not transmit the text information 'I feel depressed!' (the second communication information CI2) to the server 101 within 20 seconds, the selecting module 111 searches and selects the state display information SI corresponding to the first communication information CI1 among the basic state display information BI stored in the state display information storing module 109 of the server 101.

Here, the server 101 may be connected to another external server through the Internet, etc., and by this connection, the basic state display information BI stored in the state display information storing module 109 may be automatically updated at a preconfigured time interval.

In addition, the chatbot 103 including the selecting module 111 may analyze the first communication information CI2 transmitted from the counterpart terminal 105 to the user terminal 107 by means of machine learning, and collect and set the state display information SI corresponding to the first communication information CI1 in order of a preconfigured association.

Moreover, the chatbot 103 including the selecting module 111 may select the state display information SI corresponding to the meaning previously selected or set by a user using the user terminal 107, and transmit the state display information SI to the counterpart terminal 105 through the transmitting module 113, explained later, so that communication is continued between the user terminal 107 and the counterpart terminal 107.

In addition, the chatbot 103 including the selecting module 111 may select the state display information SI frequently used by the user terminal 107 according to a preconfigured criterion (e.g., use frequency) and transmit the state display information SI to the counterpart terminal 105 through the transmitting module 113, explained later. Alternatively, the chatbot 103 including the selecting module 111 may recommend state display information SI' similar to the state display information SI frequently used by user terminal 107 to the user terminal 107, or newly recommend state display information SI without any use frequency to the user terminal 107.

Meanwhile, the basic state display information BI stored in the state display information storing module 109 of the server 101 includes, for example, at least one of emoticon information and GIF information having an animation effect.

Of course, the state display information SI corresponding to the first communication information CI1 may also be the emoticon information, the GIF information having an animation effect, and the like, described above.

Here, the emoticon is a word made by combining an English word 'emotion' meaning 'feeling' and 'icon' meaning 'a similar sign', and refers to a symbol that expresses emotion using ASCII characters. The emoticon is used to convey emotions, which are difficult to express, in an economical and convenient way. Here, it is assumed that the emoticon contains images such as pictures and photographs that express emotions.

In addition, in the GIF information having an animation effect, GIF stands for Graphics Interchange Format, and is information that may implement a simple animation effect using a plurality of image storage functions.

Meanwhile, in the state display information transmission system 100 using a chatbot according to an embodiment of the present disclosure, any one of the server 101 and the chatbot 103 includes a transmitting module 113 configured to transmit the state display information SI to the counterpart terminal 105.

Even though the drawings show an example in which the transmitting module 113 is included in the server 101, the transmitting module 113 may also be included as a component of the chatbot 103.

The transmitting module 113 may be provided as a wireless communication module or a wired communication module.

Due to the above configuration, if the state display information transmission system 100 using a chatbot according to an embodiment of the present disclosure is used, in the user terminal 107 and the counterpart terminal 105 in which an SNS service, an instant message service, etc. operates, even when the user terminal 107 does not respond within a preconfigured response time to the text information such as 'How are you feeling today?', 'Can we meet tomorrow evening?', 'Can I make a phone call now?', etc., the chatbot 103 transmits suitable emoticon information, suitable GIF information with an animation effects, etc. to the counterpart terminal 105, thereby preventing the problem that 'mutual misunderstandings are accumulating and human relationships are being damaged'.

In addition, the user may continue proper communication with a counterpart using the counterpart terminal 105 even in various situations where it is difficult to check the user terminal 107.

Meanwhile, in the state display information transmission system 100 using a chatbot according to an embodiment of the present disclosure, the chatbot 103 includes a log module 115 configured to store a list L of the state display information SI transmitted to the counterpart terminal 105 and transmit the list L to the user terminal 107.

In other words, the log module 115 enables the user using the user terminal 107 to check the type and contents of the state display information SI automatically transmitted to the counterpart terminal 105.

Due to the log module 115, if necessary, the user using the user terminal 107 may allow the counterpart using the counterpart terminal 105 to check that the state display information SI transmitted to the counterpart terminal 105 is not transmitted by the user itself but is transmitted by the chatbot 103.

As described above, according to an embodiment of the present disclosure, in a user terminal and a counterpart terminal in which a SNS service, an instant message service, etc. operates, even when the user terminal does not respond within a preconfigured response time, the chatbot transmits proper emoticon information, etc. to the counterpart terminal, so that a user can continuously make smooth and proper communication with a counterpart.

Even though the preferred embodiment of the present disclosure has been illustrated and described above, the present disclosure is not limited to the specific preferred embodiment described above, and the present disclosure may be modified in various ways by those skilled in the art without departing from the scope of the present disclosure defined in the claims, and such modifications fall within the scope of the claims.

What is claimed is:

1. A state display information transmission system comprising:
   a processor and a memory;
   a server having a state display information storing module storing basic state display information; and
   a chatbot mounted to the server, the chatbot comprising:
   an analyzing module configured to determine whether a user terminal transmits second communication information satisfying a preconfigured condition to the server in response to first communication information transmitted from a counterpart terminal to the user terminal through the server;
   a selecting module configured to search and select state display information corresponding to the first communication information among the basic state display information, when the second communication information does not satisfy the preconfigured condition; and,
   a transmitting module configured to transmit the state display information to the counterpart terminal, wherein the preconfigured condition is a condition about time taken for the user terminal to transmit the second communication information corresponding to the first communication information to the server.

2. The state display information transmission system of claim 1, wherein the chatbot includes a log module configured to store a list about the state display information transmitted to the counterpart terminal and transmit the list to the user terminal.

3. The state display information transmission system of claim 1, wherein the basic state display information includes at least one of emoticon information and graphics interchange format (GIF) information having an animation effect.

\* \* \* \* \*